US012597662B2

(12) United States Patent
Wang et al.

(10) Patent No.:  US 12,597,662 B2
(45) Date of Patent:      Apr. 7, 2026

(54) TRACTION BATTERY PACK ENCLOSURE PATCH AND ENCLOSURE PATCHING METHOD

(71) Applicant: Ford Global Technologies, LLC, Dearborn, MI (US)

(72) Inventors: Yongcai Wang, Ann Arbor, MI (US); Tao Shen, Nanjing (CN); Ahteram Khan, Canton, MI (US); Saravanan Paramasivam, South Lyon, MI (US); Mohammadreza Eftekhari, Novi, MI (US); Anil Reddy Pullalarevu, Northville, MI (US); Mike Popovski, Warren, MI (US); Brad Warren Probert, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 964 days.

(21) Appl. No.: 17/218,301

(22) Filed: Mar. 31, 2021

(65) Prior Publication Data

US 2022/0320657 A1     Oct. 6, 2022

(51) Int. Cl.
| | |
|---|---|
| H01M 50/229 | (2021.01) |
| B60K 1/04 | (2019.01) |
| H01M 50/224 | (2021.01) |

(52) U.S. Cl.
CPC ............. H01M 50/229 (2021.01); B60K 1/04 (2013.01); H01M 50/224 (2021.01); H01M 2220/20 (2013.01)

(58) Field of Classification Search
CPC ............. H01M 50/229; H01M 50/224; H01M 2220/20; B60K 1/04
See application file for complete search history.

(56) References Cited

U.S. PATENT DOCUMENTS

| | | | |
|---|---|---|---|
| 9,331,321 B2 | 5/2016 | Berger et al. | |
| 10,115,936 B2 | 10/2018 | Fujimoto et al. | |
| 2012/0251863 A1* | 10/2012 | Berger | H01M 50/262 |
| | | | 429/99 |
| 2020/0156486 A1* | 5/2020 | Howard | B60L 50/64 |
| 2022/0181738 A1* | 6/2022 | Yasui | H01M 50/227 |
| 2022/0336900 A1* | 10/2022 | Merino | H01M 50/267 |
| 2023/0014338 A1* | 1/2023 | Greber | H01M 10/625 |

FOREIGN PATENT DOCUMENTS

| | | | | |
|---|---|---|---|---|
| CN | 210349888 | 4/2020 | | |
| WO | WO-0197583 A2 * | 12/2001 | ......... | H01M 10/425 |

* cited by examiner

*Primary Examiner* — Nicole M. Buie-Hatcher
*Assistant Examiner* — Taylor Harrison Krone
(74) *Attorney, Agent, or Firm* — David B. Kelley; Carlson, Gaskey & Olds, P.C.

(57) ABSTRACT

A traction battery pack assembly includes, among other things, an enclosure having a lid and a tray. The enclosure has a corner area connecting a first side of the enclosure to a second side of the enclosure. The first side is transverse to the second side. The assembly further includes a patch secured to the corner area.

16 Claims, 3 Drawing Sheets

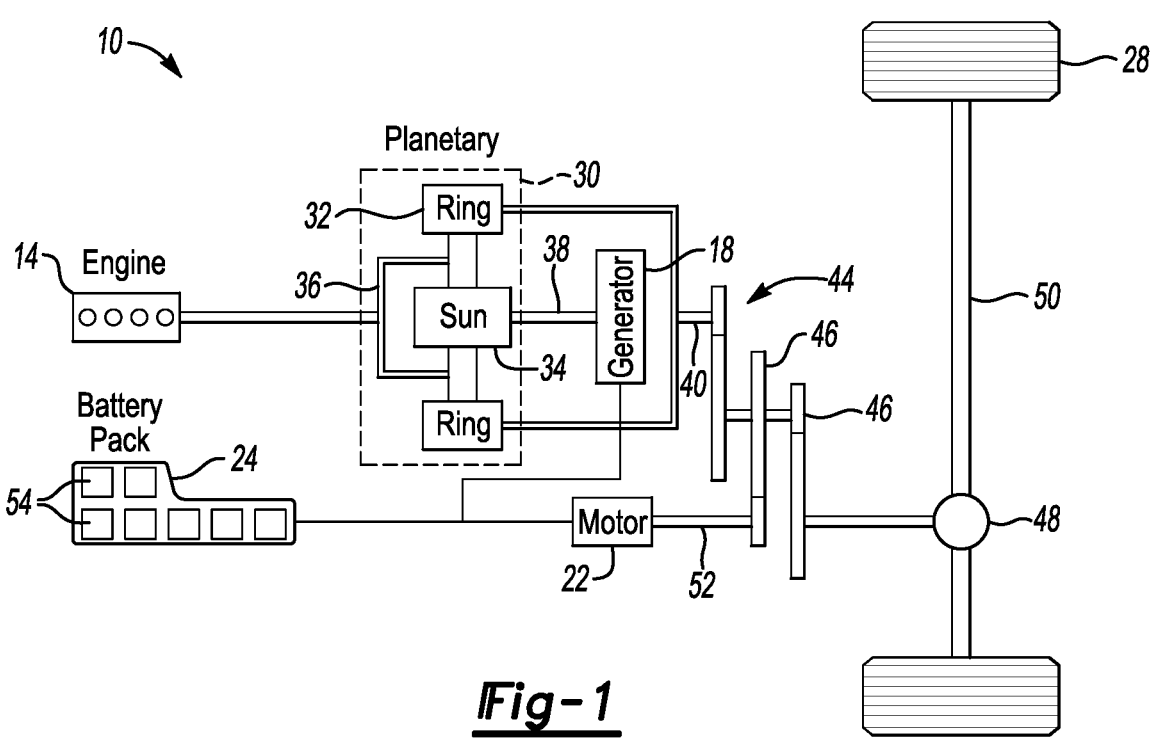
_Fig-1_
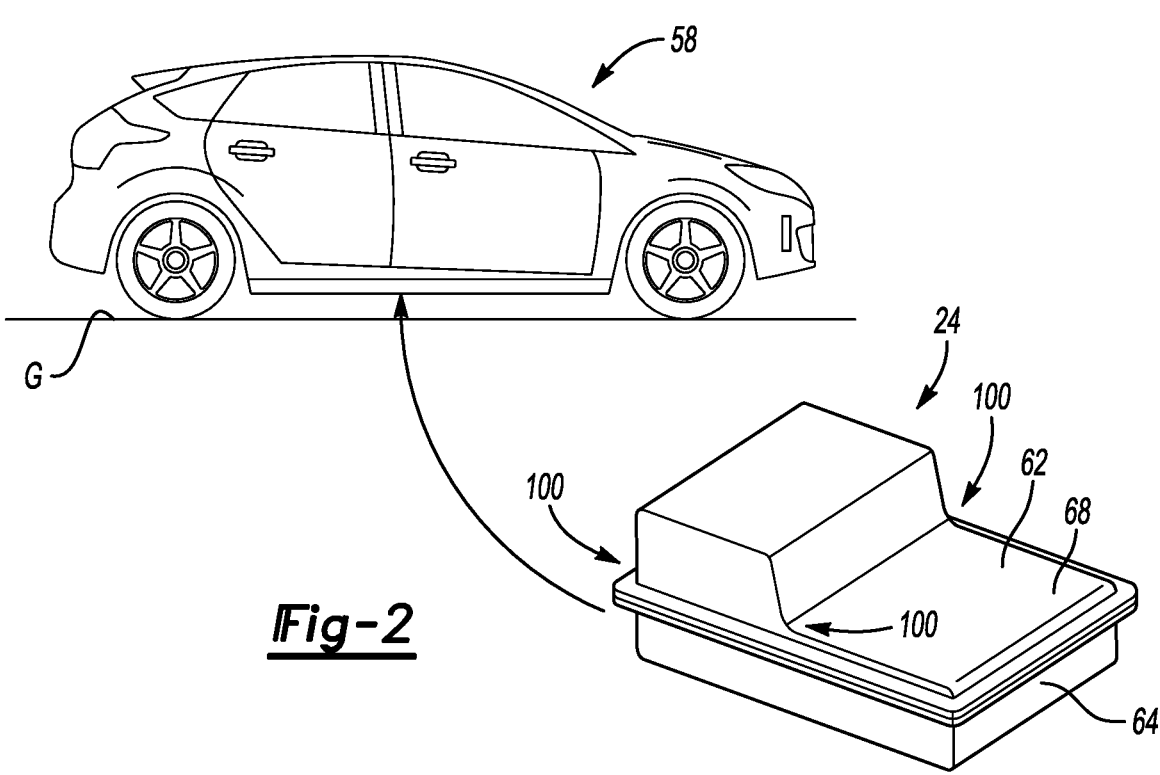
_Fig-2_

TRACTION BATTERY PACK ENCLOSURE PATCH AND ENCLOSURE PATCHING METHOD

TECHNICAL FIELD

This disclosure relates generally to a battery pack and, in particular, to a patch that reinforces areas of a battery pack enclosure.

BACKGROUND

Electrified vehicles differ from conventional motor vehicles because electrified vehicles are selectively driven using one or more electric machines powered by a traction battery pack. The electric machines can drive the electrified vehicles instead of, or in addition to, an internal combustion engine. A traction battery pack of an electrified vehicle can include a plurality of battery cell assemblies arranged in one or more battery arrays within an enclosure.

SUMMARY

A traction battery pack assembly according to an exemplary aspect of the present disclosure includes, among other things, an enclosure having a lid and a tray. The enclosure has a corner area connecting a first side of the enclosure to a second side. The first side is transverse to the second side. The assembly further includes a patch secured to the corner area.

In another example of the foregoing assembly, the corner area of the enclosure is sheet molding compound.

In another example of any of the foregoing assemblies, the patch is sheet molding compound.

In another example of any of the foregoing assemblies, the corner area connects a horizontally extending flange of the lid to a vertically extending side of the lid.

In another example of any of the foregoing assemblies, the enclosure houses a lower tier of battery modules and an upper tier of battery modules.

In another example of any of the foregoing assemblies, the patch is configured to bond to the corner area during a sheet molding compound forming process.

In another example of any of the foregoing assemblies, the patch is secured to the first side, the corner area, and the second side.

In another example of any of the foregoing assemblies, the lid includes the corner area.

In another example of any of the foregoing assemblies, the corner area further connects a third side to the first side and the second side. The third side is transverse to both the first side and the third side.

In another example of any of the foregoing assemblies, the corner area contains a first percentage of glass reinforcement, and the patch is a sheet molding compound containing a second percentage of glass reinforcement, the second percentage greater than the first percentage.

In another example of any of the foregoing assemblies, the patch is secured to an exterior surface of the enclosure.

In another example of any of the foregoing assemblies, the patch is secured to a corner area of the lid and the lid is sheet molding compound. The tray is a metal or metal alloy.

In another example of any of the foregoing assemblies, the tray is aluminum.

An enclosure patching method according to another exemplary aspect of the present disclosure includes, among other things, forming a corner area of an enclosure, and during the forming, bonding a patch to the corner area.

In another example of the foregoing method, the corner area and the patch are sheet molding compound.

In another example of any of the foregoing methods, the corner area connects a horizontally extending side of the enclosure to a vertically extending side of the enclosure.

In another example of any of the foregoing methods, the corner area connects a first side of the enclosure to a second side of an enclosure that is transverse to the first side.

In another example of any of the foregoing methods, the corner area further connects first and second sides to a third side that is transverse to both the first and second side.

In another example of any of the foregoing methods, the corner area is an upper corner area of a lid of the enclosure.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows:

FIG. 1 illustrates a highly schematic view of a powertrain for an electrified vehicle.

FIG. 2 illustrates how a battery pack of the powertrain of FIG. 1 can be positioned within the electrified vehicle according to an exemplary aspect of the present disclosure.

DETAILED DESCRIPTION

Figure 3:
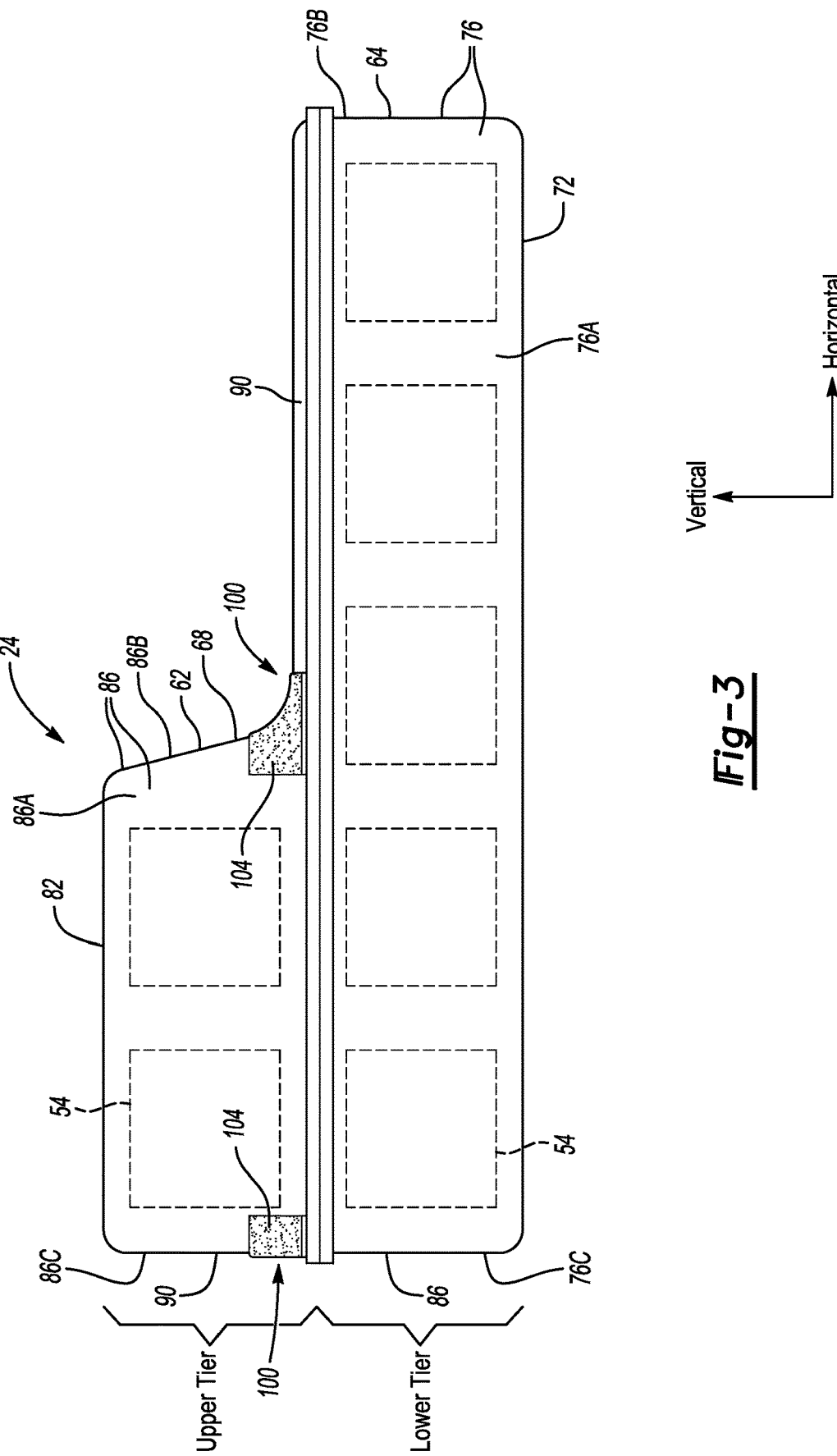
FIG. 3 illustrates a side view of the exemplary battery pack of FIG. 2.

This disclosure relates generally to a patch that reinforces area of a traction battery enclosure, particularly corner areas of the traction battery enclosure FIG. 1 schematically illustrates a powertrain 10 for an electrified vehicle 12. Although depicted as a hybrid electric vehicle (HEV), it should be understood that the concepts described herein are not limited to HEVs and could extend to other electrified vehicles, including, but not limited to, plug-in hybrid electric vehicles (PHEV's), battery electric vehicles (BEVs), fuel cell vehicles, etc.

In an embodiment, the powertrain 10 is a power-split powertrain system that employs first and second drive systems. The first drive system includes a combination of an engine 14 and a generator 18 (i.e., a first electric machine). The second drive system includes at least a motor 22 (i.e., a second electric machine), the generator 18, and a battery pack 24. In this example, the second drive system is considered an electric drive system of the powertrain 10. The first and second drive systems are each capable of generating torque to drive one or more sets of vehicle drive wheels 28 of the electrified vehicle 12. Although a power-split configuration is depicted in FIG. 1, this teachings of this disclosure extend to any hybrid or electric vehicle including full hybrids, parallel hybrids, series hybrids, mild hybrids, or micro hybrids.

The engine 14, which may be an internal combustion engine, and the generator 18 may be connected through a power transfer unit 30, such as a planetary gear set. Of course, other types of power transfer units, including other gear sets and transmissions, may be used to connect the engine 14 to the generator 18. In a non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In a non-limiting embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In a non-limiting embodiment, the motor 22 and the generator 18 cooperate as part of a regenerative braking system in which both the motor 22 and the generator 18 can be employed as motors to output torque. For example, the motor 22 and the generator 18 can each output electrical power to the battery pack 24.

The battery pack 24 is an exemplary electrified vehicle battery. The battery pack 24 may be a high voltage traction battery pack that includes a plurality of battery arrays 54 (i.e., battery assemblies or groupings of battery cells) capable of outputting electrical power to operate the motor 22, the generator 18, and/or other electrical loads of the electrified vehicle 12 for providing power to propel the drive wheels 28. Other types of energy storage devices and/or output devices could also be used to electrically power the electrified vehicle 12.

Figures 4, 5:
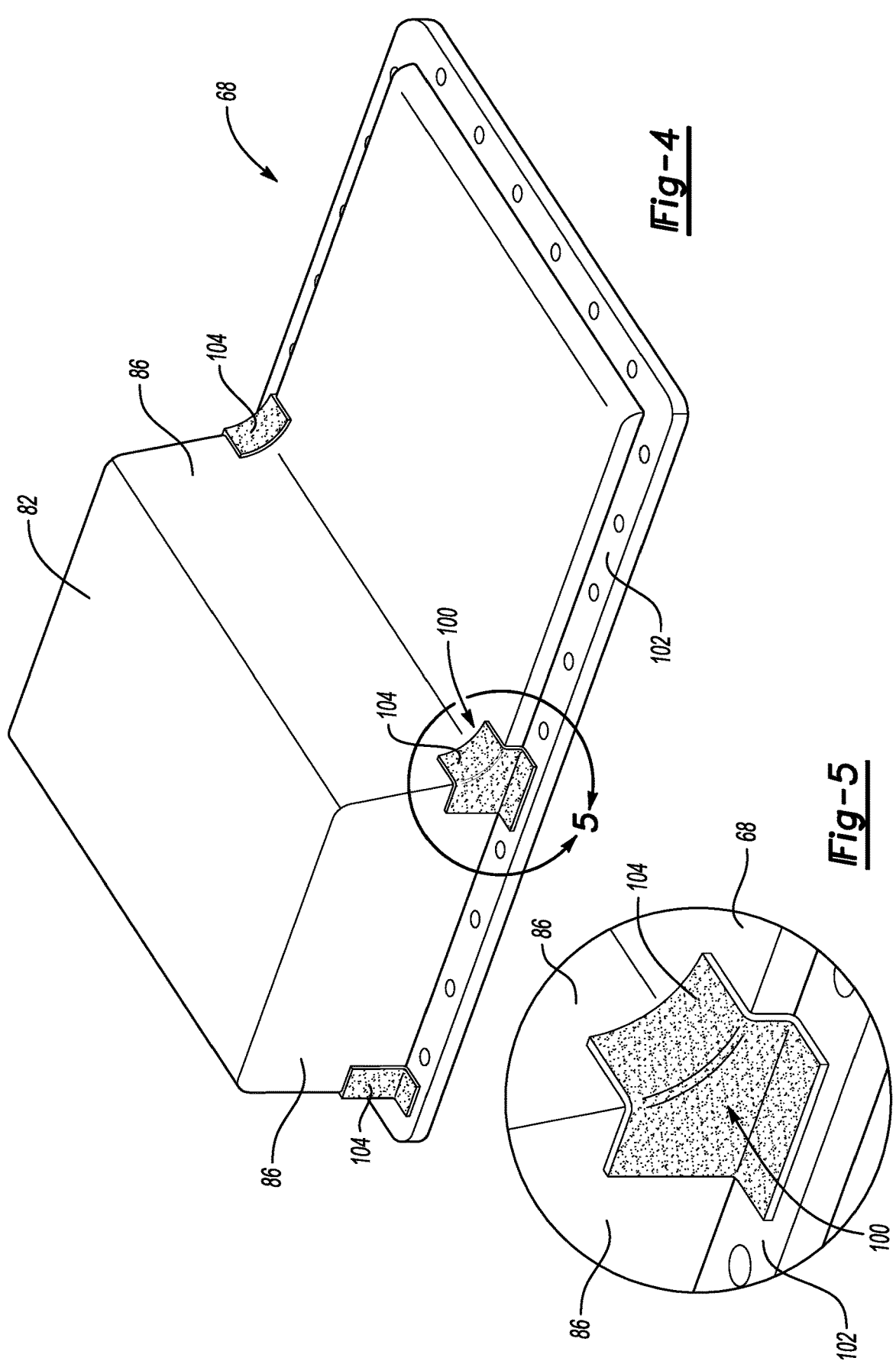
FIG. 4 illustrates a perspective view of the battery pack of FIG. 3.
FIG. 5 illustrates a close-up view of area 5 in FIG. 4.

With reference now to FIGS. 2-5, the example traction battery pack 24 includes a battery pack enclosure 62. In this example, the enclosure 62 is provided by a tray 64 and a lid 68. The battery arrays 54 are held within an interior of the enclosure 62 when the lid 68 is secured to the tray 64.

In this example, the tray 64 is a metal or metal alloy. In particular, the example tray 64 is aluminum. The tray 64 could be other materials in other examples. For example, the tray 64 could be sheet molding compound.

The tray 64 includes a floor 72 and a plurality of walls 76 extending vertically upward from the floor 72. When installed within the vehicle 58, the floor 72 of the tray 64 faces vertically downward. Also, wall 76A faces laterally outward, wall 76B faces forward, and wall 76C faces rearward. Vertical and horizontal, for purposes of this disclosure, are with reference to ground G and the general orientation of the vehicle 58 during operation.

In the exemplary embodiment, the lid 68 includes a top 82, and a plurality of walls 86 extending downwardly from the top 82. When installed within the vehicle 58, the top 82 faces vertically upward. Also, wall 86A faces laterally outward, wall 86B faces forward, and wall 86C faces rearward.

In this example, the lid 68 is a polymer or polymer-based composite material. The material can be thermoplastic or thermoset. In particular, the lid 68 in the exemplary embodiment, is a glass reinforced polymer, such as sheet molding compound.

In the installed position, the tray 64 is secured to the lid 68 of the enclosure 62 along an interface 90. The tray 64 and the lid 68 can be joined using mechanical fasteners.

When the battery pack 24 installed within the vehicle 58, the top 82 of the lid 68 can be disposed along an underside of the vehicle 58, such as along an underbody structure of the vehicle 58. The traction battery pack 24 can be disposed in this position outside the vehicle 58. In another example, the battery pack 24 could be positioned within the vehicle 58.

In this example, the battery arrays 54 are arranged in tiers. A lower tier identified in FIG. 3 includes five battery arrays 54. An upper tier designated in FIG. 3 includes two battery arrays 54.

The lid 68 includes a bumped out area having the downwardly extending side walls 86. The bumped out area accommodates the upper tier of battery arrays 54.

Stress varies throughout the lid 68. The forming process that creates the bumped-out area can, for example, stress areas of the lid 68.

In the exemplary embodiment, corner areas 100 connect the vertically extending walls 86 of the bumped-out area to a horizontally extending flange 102 of the lid 68. The corner areas 100 are radiused in this example.

The horizontally extending flange 102 extends about a periphery of the lid 68 and can be used to connect the lid 68 to a horizontally extending flange of the tray 64. The mechanical fasteners can extend through the flange 102 and a flange of the tray 64, for example.

The flange 102 is disposed along a plane transverse to a plane of the vertically extending walls 86. In particular, the flange 102 is disposed along a horizontal plane, and the vertically extending walls 86 are each disposed along a plane that is generally vertical. Thus, the corner area 100 represents a transition of approximately 90 degrees.

Patches 104 are bonded to the corner areas 100 to enhance the structural integrity of the lid 68, particularly at the corner areas 100. The patch 104 could be used in other areas of the enclosure 62 in other examples.

The patches 104 can bond to the respective corner areas 100 when forming the lid 68. In this example, the patches 104 bond to the lid 68 when the lid 68 is formed during a compression molding process. In other examples, the lid 68 is formed using a compression molding, injection molding, or resin transfer process.

The patches 104 and the lid 68 can both be sheet molding compound (SMC). In other examples, the patches 104, the lid 68, or both can be (glass mat thermoplastic (GMT), direct long glass thermoplastic (DLFT). A fiber reinforcement of the patches 104, the lid 68, or both can be glass, carbon, or natural fibers. The size of the fiber reinforcement can be short, long, or continuous.

In an example, the patches 104 are placed into a mold cavity. A sheet molding compound blank is the pressed into the mold cavity, and against the patches 104, to form the lid 68. The patches 104 bond to the lid 68 as the lid 68 is formed within the mold cavity. The patches 104 can bond to the corner areas 100, the patches 104 can also bond to portions of the flange 102 and the vertically extending sides 86.

The patches 104 can be from 0.08 to 1.20 millimeters thick. In a particular embodiment, the patch 104 is 1.00 millimeter thick and the tray 64 can be from 3.0 to 4.00 millimeters thick. In the particular embodiment, the tray is 3.50 millimeters thick. Thus, adding the protective sheet to the corner areas 100 of the lid 68 can increase a total material thickness in these areas by about 1.00 mm.

The example lid 68, and particularly the corner area 100 of the lid 68 can include a first percentage of glass filler. The patches 104 can contain a second, different percentage of glass filler. In a specific embodiment, the percent of glass filler in the patches 104 is greater than a percent of glass filler in the lid 68.

The patches 104 associated with the corner areas 100 of a rear of the enclosure 62 connect to one of the vertically extending sides 86A facing outward away from the vehicle 58, the vertically extending side 86C facing rearward in the vehicle, as well as the flange 102. The patches 104 further forward on the enclosure 62 connect to one of the vertically extending sides 86A facing outward away from the vehicle 58, the vertically extending side 86B that faces forward, and the flange 102. The patches 104 in the exemplary embodiment thus connect to both a first side and a second side that is transverse to the first side, and additionally connect to a third side that is transverse to both the first side and the second side.

The patches 104 in the exemplary embodiment, are secured to an exterior or outer surface of the enclosure 62. In other examples, one or more of the patches 104 are secured to an interior surface of the enclosure 62. In still other examples, areas of the enclosure 62 are sandwiched between a patch secured to an exterior surface and a patch secured to an interior surface.

Features of the disclosed examples include providing an enclosure with areas that are reinforced with a patch.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A traction battery assembly comprising:
an enclosure having a lid and a tray, the enclosure having a corner area connecting a first side of the enclosure to a second side of the enclosure, the first side is transverse to the second side; and
a patch secured to the corner area, wherein the patch is configured to bond to the corner area during a sheet molding compound forming process, wherein the corner area of the enclosure is sheet molding compound,
wherein the patch is sheet molding compound.

2. The assembly of claim 1, wherein the corner area connects a horizontally extending flange of the lid to a vertically extending side of the lid.

3. The assembly of claim 1, wherein the enclosure houses a lower tier of battery modules and an upper tier of battery modules.

4. The assembly of claim 1, wherein the patch is secured to the first side, the corner area, and the second side.

5. The assembly of claim 1, wherein the lid includes the corner area.

6. The assembly of claim 1, wherein the corner area further connects a third side to the first side and the second side, the third side transverse to both the first side and the second side.

7. The assembly of claim 6, wherein the patch covers a portion of an exterior surface of the first side, a portion of an exterior surface of the second side, and a portion of an exterior surface of the third side.

8. The assembly of claim 1, wherein the patch is secured to an exterior surface of the enclosure.

9. The assembly of claim 1, wherein the patch is secured to a corner area of the lid and the lid is sheet molding compound, wherein the tray is a metal or metal alloy.

10. The assembly of claim 9, wherein the tray is aluminum.

11. The assembly of claim 1, wherein the patch covers a corner of the enclosure.

12. The assembly of claim 1, wherein the patch covers an exterior surface of the enclosure.

13. The assembly of claim 1, wherein the patch covers an exterior surface of a corner of the enclosure.

14. The assembly of claim 1, wherein the patch is bonded to the corner area.

15. The assembly of claim 1, wherein a total material thickness of the enclosure in the corner area with the patch is greater than a thickness of the enclosure.

16. A traction battery assembly comprising:
an enclosure having a lid and a tray, the enclosure having a corner area connecting a first side of the enclosure to a second side of the enclosure, the first side is transverse to the second side; and
a patch secured to the corner area, wherein the patch is configured to bond to the corner area during a sheet molding compound forming process, wherein the corner area contains a first percentage of glass reinforcement, and the patch is a sheet molding compound containing a second percentage of glass reinforcement, the second percentage greater than the first percentage.

* * * * *